(12) United States Patent
Taga et al.

(10) Patent No.: US 8,948,333 B2
(45) Date of Patent: Feb. 3, 2015

(54) CLOCK FREQUENCY ERROR DETECTING DEVICE

(75) Inventors: Noboru Taga, Kanagawa (JP);
Tatsuhisa Furukawa, Kanagawa (JP)

(73) Assignee: Kabiushiki Kaisha Toshiba, Tokyo (JP)

(*) Notice: Subject to any disclaimer, the term of this patent is extended or adjusted under 35 U.S.C. 154(b) by 299 days.

(21) Appl. No.: 13/419,570

(22) Filed: Mar. 14, 2012

(65) Prior Publication Data

US 2013/0136219 A1    May 30, 2013

(30) Foreign Application Priority Data

Nov. 29, 2011  (JP) .................................. 2011-260753

(51) Int. Cl.
*H04L 7/00*    (2006.01)
*H04L 7/04*    (2006.01)

(52) U.S. Cl.
CPC ...................................... *H04L 7/042* (2013.01)
USPC ........................................................ 375/375

(58) Field of Classification Search
CPC ........... H04L 1/042; H04L 1/043; H04L 1/02; H04J 3/0611; H04J 3/0605
USPC ................................................. 375/354, 375
See application file for complete search history.

(56) References Cited

U.S. PATENT DOCUMENTS

| | | | |
|---|---|---|---|
| 2009/0296800 A1 | 12/2009 | Tseng et al. | |
| 2009/0304062 A1 | 12/2009 | Tseng et al. | |
| 2010/0034300 A1 | 2/2010 | Xiang et al. | |
| 2010/0226467 A1* | 9/2010 | Furukawa et al. | 375/359 |

FOREIGN PATENT DOCUMENTS

JP    2010-206511    9/2010

* cited by examiner

*Primary Examiner* — Kevin M Burd
(74) *Attorney, Agent, or Firm* — Oblon, Spivak, McClelland, Maier & Neustadt. L.L.P.

(57) ABSTRACT

A clock frequency error detecting device includes a system storage portion which stores a synchronization system based on at least one of several types of frame synchronization signals included in a received signal in which a frame synchronization signal in each frame includes a part obtained by shifting of a frame synchronization signal of another frame by a symbol by using a predetermined rule; a pattern matching portion which performs pattern matching between the received signal and the synchronization system; a symbol counter which outputs a symbol number; a timing detection portion which detects the frame synchronization signal of each frame based on a pattern matching processing result and to output the symbol number at the detection timing; and a frequency error detection portion which detects a change of the symbol number and to detect a clock frequency error of the symbol period based on the detection.

16 Claims, 10 Drawing Sheets

FIG.2A
(PRIOR ART)

FH MODE 1

420 SYMBOL | 3780 SYMBOL

FIG.2B
(PRIOR ART)

FH MODE 2

595 SYMBOL | 3780 SYMBOL

FIG.2C
(PRIOR ART)

FH MODE 3

945 SYMBOL | 3780 SYMBOL

FIG.3A (PRIOR ART)

FH MODE 1

FIG.3B (PRIOR ART)

FH MODE 3

CLOCK FREQUENCY ERROR DETECTING DEVICE

CROSS-REFERENCE TO RELATED APPLICATION

This application is based upon and claims the benefit of priority from the prior Japanese Patent Applications No. 2011-260753, filed on Nov. 29, 2011; the entire contents of which are incorporated herein by reference.

FIELD

Embodiments herein relates generally to a clock frequency error detecting device configured to detect a clock frequency error of a clock reproduced from transmission data in broadcasting and communication fields.

BACKGROUND

In the broadcasting and communication fields, data is transmitted by a block having a given length such as frame. A receiving device detects an identifier, such as a frame synchronization signal, stored in the transmission data by a frame, establishes frame synchronization thereby and executes demodulation processing by the frame.

For example, in DTMB (Digital Terrestrial Multimedia Broadcast), which is a terrestrial digital broadcasting standard of China (People's Republic of China), a frame is composed of a frame body (hereinafter also referred to as an FB) and a frame header (hereinafter also referred to as an FH). The frame body stores 3780 symbols in which modulated source stream data and system information are combined. The frame header stores a known pseudo random noise sequence (hereinafter referred to as a PN sequence) which identifies a frame.

The PN sequence of the frame header is generated by an LFSR (linear feedback shift register). The LFSR can generate a known PN sequence having periodicity and in an FH mode 1, for example, a known frame header is obtained by circulating and expanding a generation sequence PN255 defined by a generating polynominal. Since the frame header is a known PN sequence, the frame header is used not only in detection of frame synchronization but also used as a pilot signal and can be used in demodulation processing such as channel response estimation or the like.

As a method of detecting the clock frequency error in reception of a signal of the DTMB broadcasting standard and of performing clock regeneration, a pattern matching method can be considered. If there is a clock frequency error, detection timing of a correlation peak obtained by the pattern matching is shifted. Clock regeneration is realized by detecting the shift in detection timing of the correlation peak so as to estimate a clock frequency error.

However, since the position of the PN sequence is changed for each initial value (frame number) of the LFSR, it cannot be discriminated whether a cause of the shift in detection timing of the correlation peak comes from a difference of a frame number or a clock frequency error, until super frame synchronization is established. Thus, the super frame synchronization should be established first in order to perform clock regeneration. Alternatively, a method of averaging the correlation peak detection timing by a super frame in order to detect the clock frequency error. In any case, the detection of the clock frequency error takes time, and there is a problem that clock regeneration takes a long time.

Moreover, if there is multipath interference, the correlation peak caused by the multipath interference might be used for detection of the clock frequency error, and there is a problem that the clock frequency error might be erroneously detected.

DETAILED DESCRIPTION

According to embodiments, a clock frequency error detecting device includes a system storage portion configured to store a synchronization system on the basis of at least one of several types of frame synchronization signals included in a received signal in which one frame is composed of a predetermined number of symbols and a frame synchronization signal in each frame includes a part obtained by shifting of a frame synchronization signal of another frame by a symbol by using a predetermined rule, a pattern matching portion configured to perform pattern matching between the inputted received signal and the synchronization system stored in the system storage portion, a symbol counter configured to count up clocks of a symbol period and to output a count value as a symbol number, a timing detection portion configured to detect the frame synchronization signal of each frame on the basis of a pattern matching processing result of the pattern matching portion and to output the symbol number at the detection timing, and a frequency error detection portion configured to detect a change of the symbol number from the timing detection portion and to detect a clock frequency error of the symbol period on the basis of the detected change and the predetermined rule.

The embodiments of the present invention will be described below in detail by referring to the attached drawings.

First Embodiment

Figure 1:
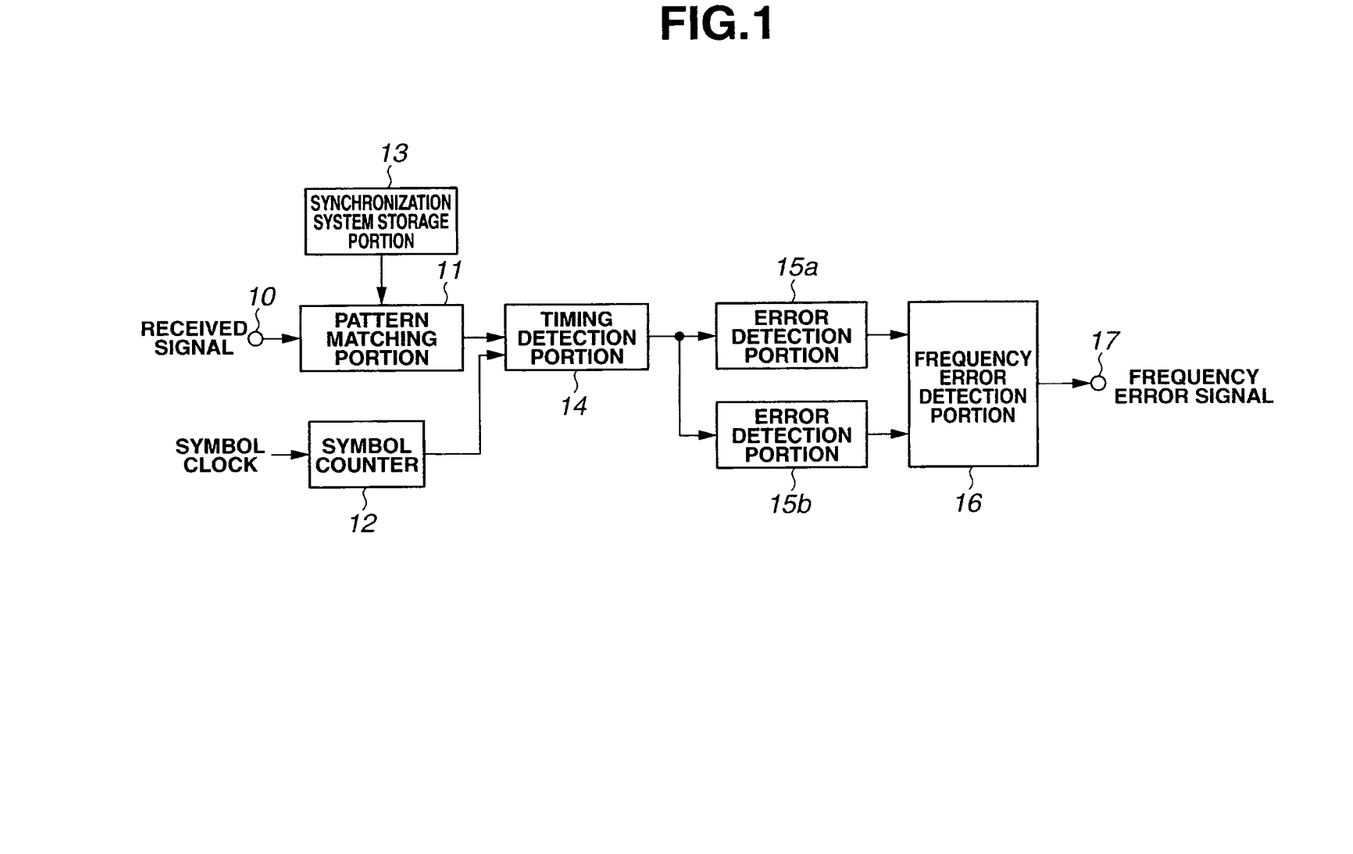
FIG. 1 is a block diagram illustrating a clock frequency error detecting device according to a first embodiment of the present invention.

FIG. 1 is a block diagram illustrating a clock frequency error detecting device according to a first embodiment of the present invention. This embodiment is an example applied to clock frequency error detection of the DTMB.

Figure 2A:
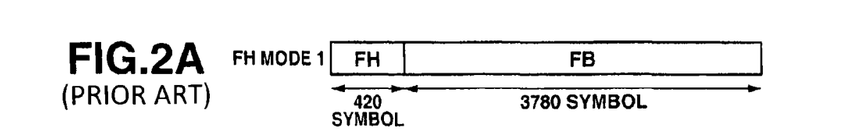
FIGS. 2A to 2C are explanatory diagrams illustrating a configuration of a frame of DTMB.
Figure 2B:
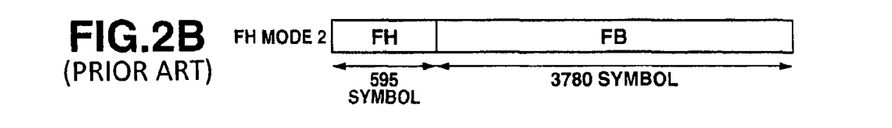
Figure 2C:
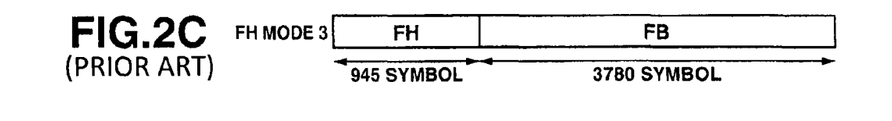

First, a broadcasting signal of the DTMB will be described by referring to FIGS. 2A to 4. FIGS. 2A to 2C illustrate frame configurations of the DTMB and FIGS. 2A to 2C illustrate an FH mode 1 to an FH mode 3, respectively.

The DTMB has three modes, that is, the FH mode 1 to the FH mode 3, and in the FH mode 1 and the FH mode 3, the PN sequences of the frame header do not have the same pattern in each frame but have a pattern changing by a frame. Therefore, in the FH mode 1 and the FH mode 3, the PN sequence of the frame header needs to be estimated by the frame in order to use the PN sequence of the frame header as a pilot signal.

As illustrated in FIGS. 2A to 2C, each frame of the DTMB is composed of a frame header (FH) and a frame body (FB). The frame body is configured to have a 3780 symbol length in each mode. The symbol length of the frame header is different depending on the mode, and the FH mode 1 has a 420 symbol length, the FH mode 2 has a 595 symbol length, and the FH mode 3 has a 945 symbol length.

Figure 3A:
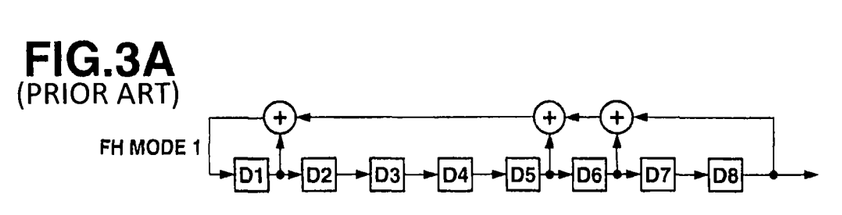
FIGS. 3A and 3B are circuit diagrams illustrating specific circuit configurations of an LFSR configured to generate a frame header of the DTMB.
Figure 3B:
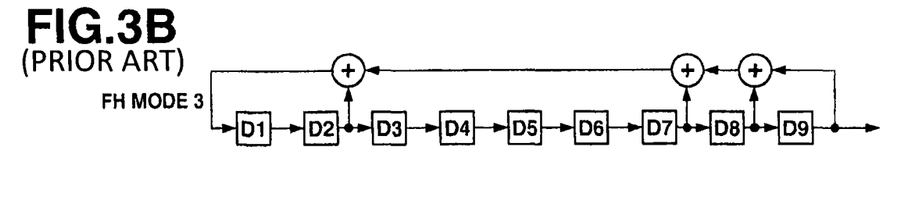

FIGS. 3A and 3B are circuit diagrams illustrating specific circuit configurations of an LFSR which generates a frame header of the DTMB. The LFSR can generate 255 types of the PN sequences in the FH mode 1 or 511 types in the FH mode 3 according to a difference in an initial value set for the LFSR. In the FH mode 1 and the FH mode 3, the PN sequence pattern employed for the frame header is a part of the 255 types or 511 types of the PN sequences that can be generated by the LFSR. In the FH mode 1 and the FH mode 3, the PN sequence of each frame header corresponds to each initial value of the LFSR, and correspondence between a frame number assigned to each frame and the initial value of the LFSR is defined in the standard.

In the DTMB, one super frame is defined by the predetermined number of frames according to the mode. A time length of one super frame is fixed to 125 ms, and use in a system requiring time collation such as GPS is assumed. Super frame synchronization can be established by estimating the frame number.

FIG. 3A illustrates a configuration of the LFSR which generates a frame header of the FH mode 1, and FIG. 3B illustrates a configuration of the LFSR which generates a frame header of the FH mode 3. The LFSR illustrated in FIG. 3A is composed of cascade-connected eight delayers D1 to D8 and three adders. If a predetermined initial value is given to each of the delayers D1 to D8 in the LFSR in FIG. 3A, a PN sequence of a frame header of a predetermined frame in the FH mode 1 can be generated. Similarly, the LFSR illustrated in FIG. 3B is composed of cascade-connected nine delayers D1 to D9 and three adders. If a predetermined initial value is given to each of the delayers D1 to D9, the LFSR in FIG. 3B can generate a PN sequence of a frame header of a predetermined frame in the FH mode 3.

A received signal inputted into an input terminal 10 in FIG. 1 is a DTMB broadcasting signal in the FH mode 1 or the FH mode 3. This broadcasting signal is received by an antenna, not shown, and obtained by digitalization by an A/D converter, not shown. The received signal is supplied to a pattern matching portion 11.

The synchronization system storage portion 13 stores the same pattern as a part or the whole of the PN sequences included in the frame header of the received signal (hereinafter referred to as synchronization system). A synchronization system from the synchronization system storage portion 13 is also given to the pattern matching portion 11.

A symbol clock is given to a symbol counter 12. The symbol counter 12 is reset by a symbol number constituting one frame, counts up symbol clocks and outputs a count value (hereinafter referred to as a symbol number) to a timing detection portion 14. A clock generation portion receives an input of a frequency error signal, which will be described later, corrects the clock generated in a symbol period on the basis of the frequency error signal and generates a symbol clock. The symbol clock from the clock generation portion is supplied to the symbol counter 12.

The pattern matching portion 11 receives an input of each symbol of the received signal, executes pattern matching processing between the received signal with the predetermined symbol length and the synchronization system from the synchronization system storage portion 13, and outputs a correlation result between the received signal and the synchronization system from the synchronization system storage portion 13 to the timing detection portion 14.

Various methods can be employed as pattern matching processing in the pattern matching portion 11, and sliding correlation, matching filter processing and the like, for example, can be considered. For example, a correlation waveform indicating correlation having an impulse shape is outputted from the pattern matching portion 11.

Figure 4:
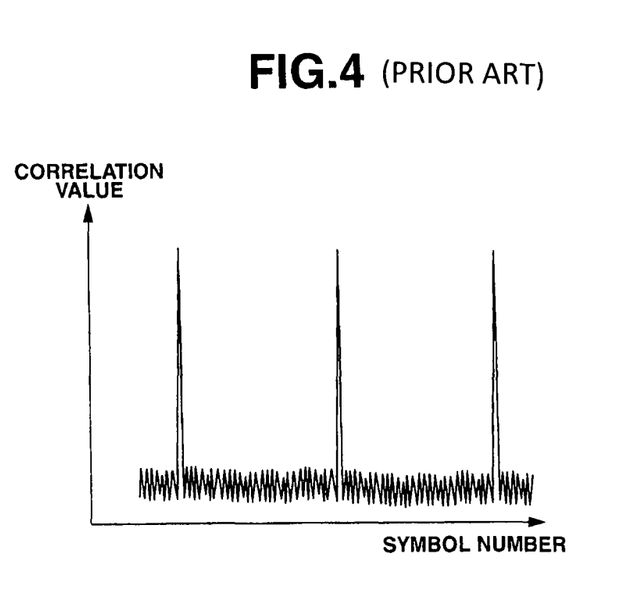
FIG. 4 is a graph illustrating a correlation result of pattern matching having a symbol number on a lateral axis and a correlation value on a vertical axis.

FIG. 4 is a graph illustrating a correlation result of the pattern matching having a symbol number on a lateral axis and a correlation value on a vertical axis. As illustrated in FIG. 4, a correlation result with an extremely high correlation value is outputted from the pattern matching portion 11 every predetermined symbol number period. The extremely high correlation value is obtained at timing when matching between a part or the whole of the PN sequence included in the received signal and the synchronization system from the synchronization system storage portion 13 is detected in the pattern matching processing by the pattern matching portion 11.

The timing detection portion 14 detects the timing when the correlation result with the maximum correlation value is obtained for each frame and outputs a symbol number from the symbol counter 12 at the detected timing as a synchronization detection symbol number to error detection portions 15a and 15b and detection range setting portions 18a and 18b.

Figure 5:
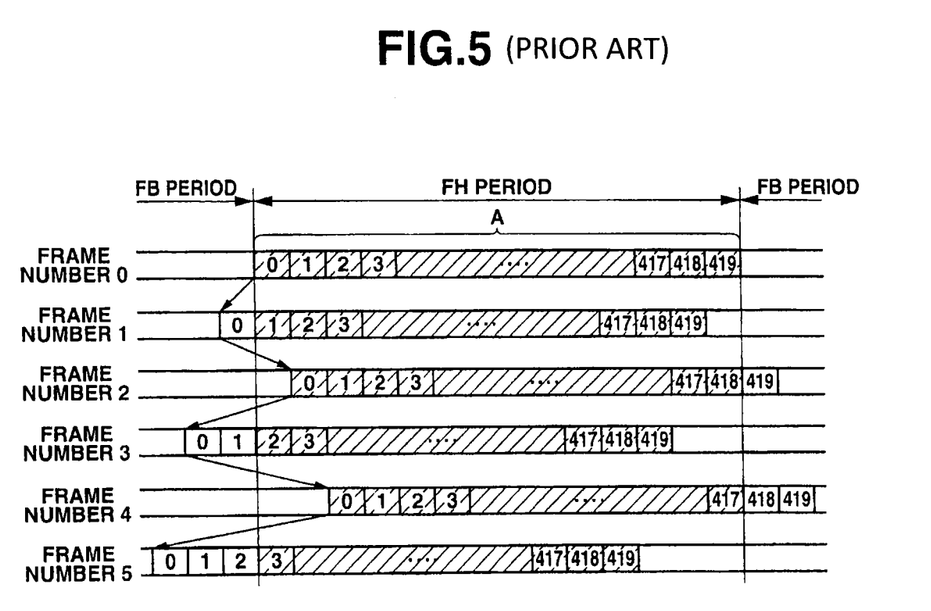
FIG. 5 is an explanatory diagram for explaining arrangement of a PN sequence of a frame header of a broadcasting signal of the DTMB.

FIG. 5 is an explanatory diagram for explaining arrangement of the PN sequence of the frame header of the broadcasting signal in the DTMB. FIG. 5 illustrates the PN sequence in the FH mode 1, for example, and the PN sequence is similarly arranged in the FH mode 3, too. In FIG. 5, the frame numbers 0, 1, . . . correspond to a first, a second, . . . frames constituting one super frame in the FH mode 1. FIG. 5 indicates that the 420-symbol PN sequence constituting the frame header of the frame number 0 is a sequence A. FIG. 5 indicates that the symbol numbers 1 to 419 obtained by shifting the sequence A of the frame having the frame number 0 forward only by one symbol in the subsequent frame having the frame number 1 are included in the frame header period and that the symbol numbers 0 to 418 obtained by shifting the sequence A of the frame having the frame number 0 rearward only by one symbol in the subsequent frame having the frame number 2 are included in the frame header period.

Similarly, FIG. 5 indicates that in the subsequent frame having the frame number 3, the symbol numbers 2 to 419 obtained by shifting the sequence A of the frame having the frame number 0 forward only by two symbols are included in the frame header period, and in the subsequent frame with the frame number 4, the symbol numbers 0 to 417 obtained by shifting the sequence A of the frame having the frame number 0 rearward only by two symbols are included in the frame header period.

After that, similarly, regarding the PN sequence of the frame header of the broadcasting signal of the DTMB, a direction of shifting is changed each time the frame number is changed by one, and a shift amount is increased or decreased only by one symbol each time the frame number is changed by two. That is, a part of the sequence A is included in the frame header of each frame.

The synchronization system storage portion 13 holds the synchronization system corresponding to this sequence A, and the pattern matching portion 11 sequentially compares the received signal with the sequence A. Then, the timing detection portion 14 obtains detection timing of the sequence A included in the sequentially inputted received signal from the output of the pattern matching portion 11. Since a part of the sequence A is included in any frame, a peak of a correlation value appears in each frame, and the peak position is shifted only by the symbol number corresponding to the frame number depending on the characteristics in FIG. 5.

Figure 6:
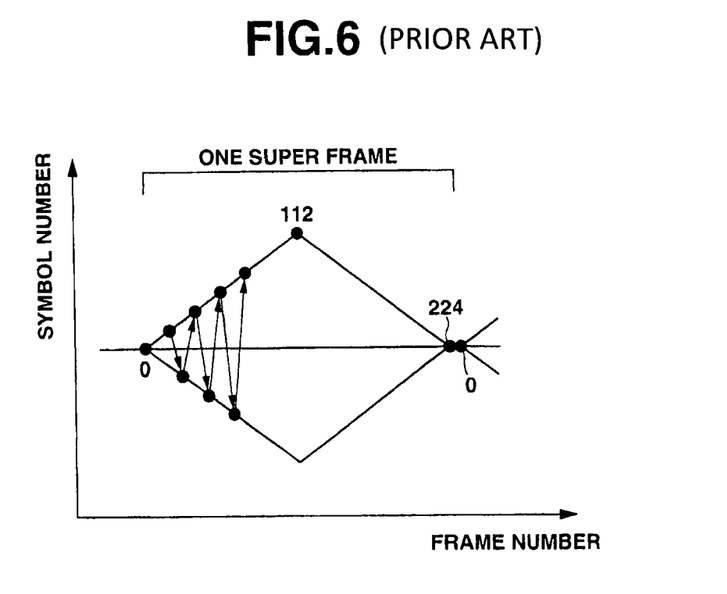
FIG. 6 is an explanatory diagram illustrating a relationship between a synchronization detection symbol number and a frame number having a frame number on a lateral axis and a symbol number on a vertical axis.

FIG. 6 illustrates a relationship between the synchronization detection symbol number and the frame number having a frame number on a lateral axis and a symbol number on a vertical axis. FIG. 6 indicates the synchronization detection symbol number detected in each frame in the FH mode 1 as a black circle. Since the arrangement of the PN sequence has the characteristics in FIG. 5, the synchronization detection symbol number repeats increase/decrease each time the frame number is changed by one as illustrated in FIG. 6, and the closer the frame number gets to 0, the smaller the increase/decrease amount becomes. The black circles indicating the synchronization detection symbol numbers appear on a solid line in FIG. 6, but only a part of the black circles are illustrated in FIG. 6 for simplification of the drawings.

If clock synchronization is established, the symbol counter 12 is set to an initial value at predetermined symbol timing, is counted up each time one symbol of the received signal is inputted and is reset at every symbol number of a frame after that. Therefore, the count value (symbol number) from the symbol counter 12 and the position of each symbol in one frame correspond to each other on a one-to-one basis.

However, if the clock synchronization is not established, a figure of a diamond in FIG. 6 is deformed in accordance with a clock frequency error. In this case, too, if super frame synchronization is established, the clock frequency error is detected as a shift of the synchronization detection symbol number, and thus, the clock synchronization can be easily established. However, if the super frame synchronization is not established, a clock frequency shift and a detection symbol number shift cannot be discriminated from each other, and the clock frequency error cannot be easily detected from the shift in the synchronization detection symbol number.

Thus, in this embodiment, the clock frequency error is detected by the error detection portions 15a and 15b and the frequency error detection portion 16 before the super frame synchronization is established.

Figure 7:
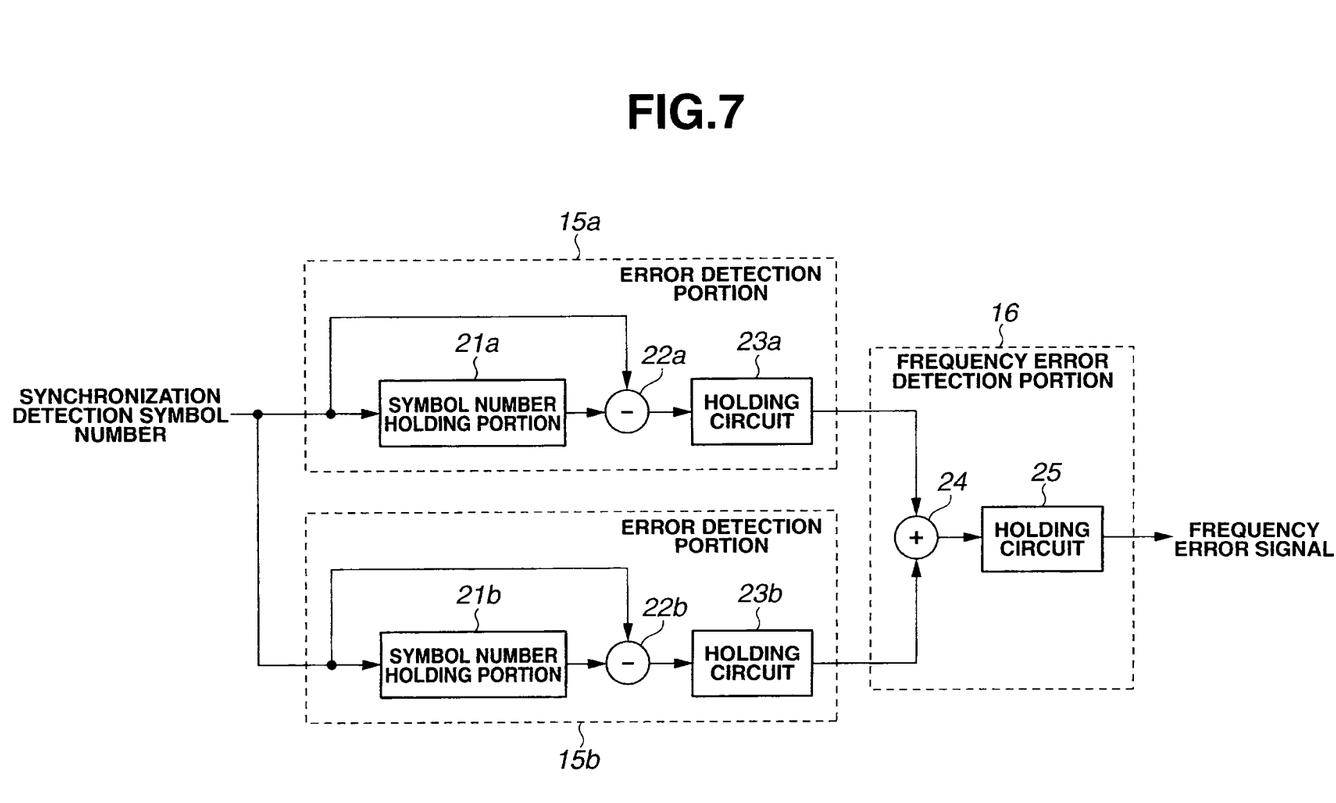
FIG. 7 is a block diagram illustrating a specific configuration of error detection portions 15a and 15b and a frequency error detection portion 16 in FIG. 1.

FIG. 7 is a block diagram illustrating specific configurations of the error detection portions 15a and 15b and the frequency error detection portion 16 in FIG. 1.

The synchronization detection symbol number detected in each frame is inputted into the error detection portions 15a and 15b. The error detection portions 15a and 15b operate alternately in each frame. For example, the error detection portion 15a operates at a frame having an even frame number (hereinafter referred to as an even-number frame) and the error detection portion 15b operates at a frame having an odd frame number (hereinafter referred to as an odd-number frame).

A symbol number holding portion 21a of the error detection portion 15a holds the inputted synchronization detection symbol number for two frame periods and outputs the synchronization detection symbol number detected in an even-number frame to a subtractor 22a. On the other hand, a symbol number holding portion 21b of the error detection portion 15b holds the inputted synchronization detection symbol number for two frame periods and outputs the synchronization detection symbol number detected in the odd-number frame to a subtractor 22b.

The subtractor 22a acquires a difference between the synchronization detection symbol numbers detected before and after two frame periods in the even-number frame by subtracting the synchronization detection symbol number outputted from the symbol number holding portion 21a from the synchronization detection symbol number inputted into the error detection portion 15a. The output of the subtractor 22a is given to the adder 24 of the frequency error detection portion 16 through a holding circuit 23a.

On the other hand, the subtractor 22b acquires a difference between the synchronization detection symbol numbers detected before and after the two-frame periods in the odd-number frame by subtracting the synchronization detection symbol number outputted by the symbol number holding portion 21b from the synchronization detection symbol number inputted into the error detection portion 15b. The output of the subtractor 22b is given to the adder 24 of the frequency error detection portion 16 through the holding circuit 23b.

The holding circuits 23a and 23b hold the outputs of the subtractors 22a and 22b, respectively, and also provide outputs to the adder 24 of the frequency error detection portion 16 at the same timing. The adder 24 adds the outputs of the holding circuits 23a and 23b together and gives the result to the holding circuit 25. The holding circuit 25 holds the addition result of the adder 24 and then, outputs it to an output terminal 17 as a frequency error signal.

In this configuration, the error detection portions 15a and 15b detect changes in the synchronization detection symbol numbers inputted every other frame, respectively. If clock synchronization is established, the synchronization detection symbol numbers detected every other frame increase by one or decrease by one as illustrated in FIG. 5. That is, the output of the error detection portion 15a and the output of the error detection portion 15b have the same size and different signs. Therefore, the addition result of the adder 24 is 0.

On the other hand, if the clock synchronization is not established and there is a clock frequency error, the output of the error detection portion 15a and the output of the error detection portion 15b have different sizes. The sum of the outputs of the subtractors 22a and 22b indicates a clock frequency error, and the frequency error signal can be acquired by adding the outputs of the subtractors 22a and 22b by using the frequency error detection portion 16.

Figure 8:
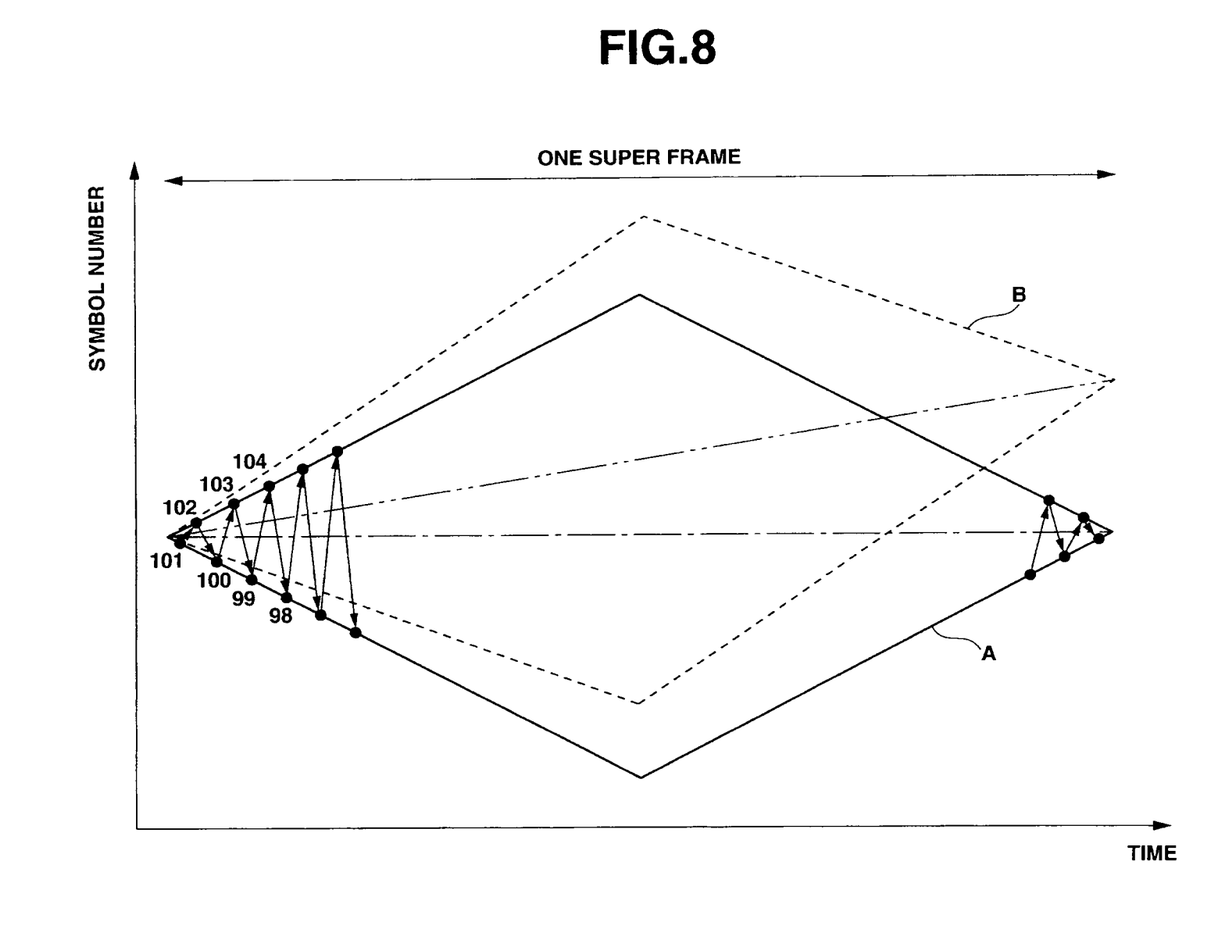
FIG. 8 is an explanatory diagram for explaining an operation of the first embodiment.

Subsequently, an operation of the embodiment configured as above will be described by referring to FIG. 8. FIG. 8 is an explanatory diagram for explaining actions of the error detection portions 15a and 15b and the frequency error detection portion 16. FIG. 8 illustrates the synchronization detection symbol number detected by the timing detection portion 14 having time on the lateral axis and the symbol number on the vertical axis. FIG. 8 illustrates an example in which the clock synchronization is established by a solid line A and an example in which the clock synchronization is not established by a broken line B. The black circles indicating the synchronization detection symbol numbers appear on the solid line A or the broken line B in FIG. 8 but only a part of the black circles are illustrated in FIG. 8 for simplification of the drawings.

If the clock synchronization is established, the black circles indicating the synchronization detection symbol numbers appear on the slid line A in FIG. 8. The numerals in FIG. 8 illustrate an example of the synchronization detection symbol numbers detected in each frame. If the clock synchronization is not established and there is a clock frequency error, the black circles indicating the synchronization detection symbol numbers appear on a line corresponding to the clock frequency error or on the broken line B in FIG. 8, for example.

The received signal is given to the pattern matching portion 11, and the received signal and the sequence A are sequentially compared for pattern. The timing detection portion 14 obtains the detection timing of the sequence A included in the sequentially inputted received signals from the outputs of the pattern matching portion 11. The timing detection portion 14 detects the peak of the correlation value for each frame from the output of the pattern matching portion 11 and outputs the symbol number of the detection timing as a synchronization detection symbol number.

The synchronization detection symbol number detected for each frame is inputted to the error detection portions 15a and 15b. The error detection portions 15a and 15b operate alternately in each frame and detect changes in the synchronization detection symbol numbers inputted every other frame, respectively.

The error detection portion 15a detects a change in the synchronization detection symbol number detected in the even-number frame or the change in the synchronization detection symbol number appearing on the two sides on the upper side of the solid line A (broken line B) in FIG. 8, for example, while the error detection portion 15b detects a change in the synchronization detection symbol number detected in the odd-number frame or the synchronization detection symbol number appearing on the two sides on the lower side of the solid line A (broken line B) in FIG. 8, for example.

That is, the subtractor 22a acquires the difference between the synchronization detection symbol numbers detected before and after the two frame periods in the even-number frame by subtracting the synchronization detection symbol number outputted by the symbol number holding portion 21a from the synchronization detection symbol number inputted into the error detection portion 15a. In the example of the solid line A in FIG. 8, for example, if it is assumed that the synchronization detection symbol number (103) is inputted into the error detection portion 15a at the timing when the synchronization detection symbol number (102) is outputted from the symbol number holding portion 21a, the output of the subtractor 22a is 103−102=+1. The output of the subtractor 22a is given to the adder 24 of the frequency error detection portion 16 through the holding circuit 23a.

On the other hand, the subtractor 22b acquires the difference between the synchronization detection symbol numbers detected before and after the two frame periods in the odd-number frame by subtracting the synchronization detection symbol number outputted by the symbol number holding portion 21b from the synchronization detection symbol number inputted into the error detection portion 15b. In the example of the solid line A in FIG. 8, for example, if it is assumed that the synchronization detection symbol number (100) is inputted into the error detection portion 15b at the timing when the synchronization detection symbol number (101) is outputted from the symbol number holding portion 21b, the output of the subtractor 22b is 100−101=−1. The output of the subtractor 22b is given to the adder 24 of the frequency error detection portion 16 through the holding circuit 23b.

As illustrated by the solid line A in FIG. 8, if the clock synchronization is established, the change detected by the error detection portion 15a and the change detected by the error detection portion 15b are the same in the size (change amount) and different in the direction (direction change). Therefore, if the change detected by the error detection portion 15a and the change detected by the error detection portion 15b are added together, the addition result becomes 0.

On the other hand, if the clock synchronization is not established and there is a clock frequency error or if the synchronization detection symbol number is detected on the broken line B in FIG. 8, for example, the output of the error detection portion 15a and the output of the error detection portion 15b are different in the size. That is, the output of the subtractor 22a does not become +1 but becomes a value according to the clock frequency error. Moreover, the output of the subtractor 22b does not become −1 but becomes a value according to the clock frequency error. The larger the frequency error is, the larger the absolute value of the sum of the outputs of the subtractors 22a and 22b becomes. That is, this addition result becomes a value according to the frequency error. The adder 24 adds the outputs of the holding circuits 23a and 23b together and gives the result to the holding circuit 25. The holding circuit 25 outputs the addition result of the adder 24 as a frequency error signal.

As described above, in this embodiment, the change in the synchronization detection symbol number every other frame is detected so as to acquire a clock frequency error, and the clock synchronization can be established by acquiring the clock frequency error in a short time before the super frame synchronization is established.

Second Embodiment

Figure 9:
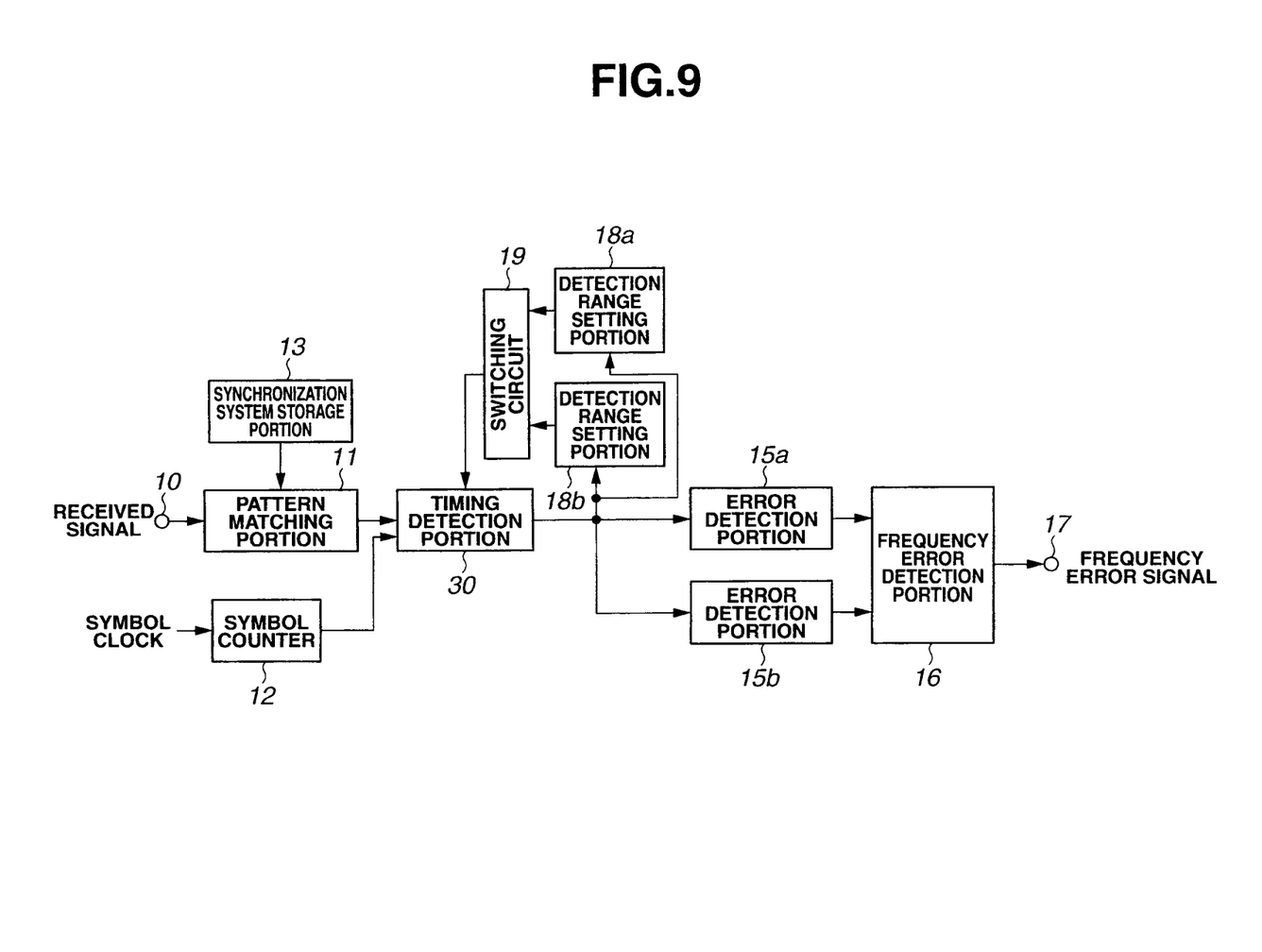
FIG. 9 is a block diagram illustrating a second embodiment of the present invention.

FIG. 9 is a block diagram illustrating a second embodiment of the present invention. In FIG. 9, the same constituent element as those in FIG. 1 are given the same reference numerals, and the description will be omitted. This embodiment is different from the first embodiment in that a timing detection portion 30 is employed instead of the timing detection portion 14, and detection range setting portions 18a and 18b and a switching circuit 19 are added.

The timing detection portion 14 acquires the position of a correlation peak between the received signal acquired by the pattern matching portion 11 and the sequence A on the basis of the symbol number. However, if there is multipath interference, a correlation peak caused by the multipath interference wave might occur in the frame other than the correlation peak by a desired wave. Moreover, the timing detection portion 14 might detect the synchronization detection symbol number at the correlation peak position caused by the multipath interference wave depending on the level of the correlation peak caused by the multipath interference wave. If the synchronization detection symbol numbers on the basis of the correlation peaks caused by the desired wave and the interference wave are mixed, a clock frequency error cannot be stably detected.

Thus, in this embodiment, the synchronization detection symbol number is detected only on the basis of the correlation peak of the desired wave, for example, by setting a detection range of the synchronization detection symbol number. The timing detection portion 30 detects the peak of the correlation value in the detection range set by the detection range setting portions 18a and 18b. As described above, the timing detection portion 30 is different from the timing detection portion 14 in the point that the detection range of the synchronization detection symbol number is limited by the detection range setting portions 18a and 18b.

The detection range setting portion 18a operates for the even-number frames and the detection range setting portion 18b operates for the odd-number frames. Each of the detection range setting portions 18a and 18b outputs a detection range signal for setting the detection range two frames after the synchronization detection symbol number inputted with two-frame intervals. The switching circuit 19 gives the detection range signal from the detection range setting portion 18a to the timing detection portion 30 in the even-number frame and gives the detection range signal from the detection range setting portion 18b to the timing detection portion 30 in the odd-number frame.

For example, each of the detection range setting portions 18a and 18b sets the range combining ±1 symbol, which is a PN sequence fluctuation portion of the frame header in the two frames and a fluctuation portion caused by the predetermined clock frequency error as a detection range.

Therefore, the pattern matching and timing detection should be performed in a wide range of ±56 symbols or more in the FH mode 1, for example, in the two frames immediately after the clock frequency error detection is started, but after that, it is only necessary to perform the pattern matching and the timing detection only in the range combining the above PN sequence fluctuation portion and the fluctuation portion caused by the predetermined clock frequency error, and an arithmetic amount can be also reduced.

Figure 10:
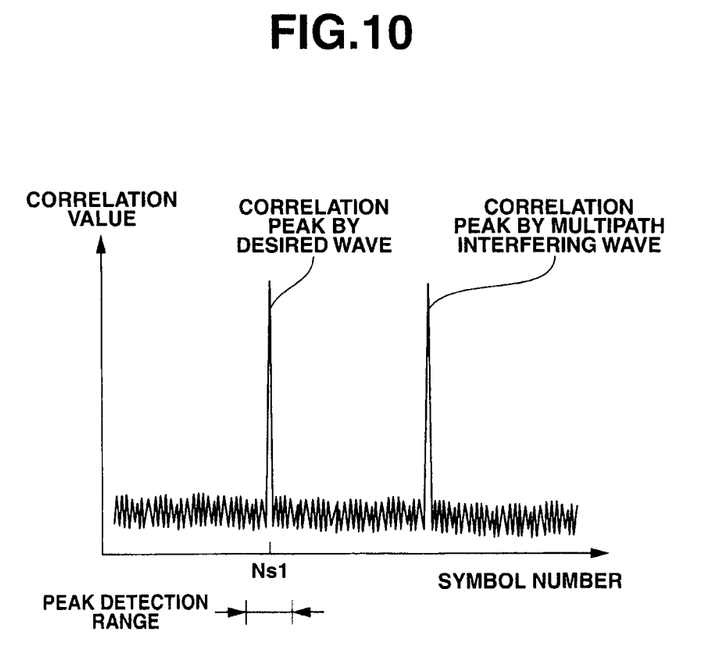
FIG. 10 is a graph illustrating a correlation result of pattern matching in a predetermined 1 frame period having a symbol number on a lateral axis and a correlation value on a vertical axis.
Figure 11:
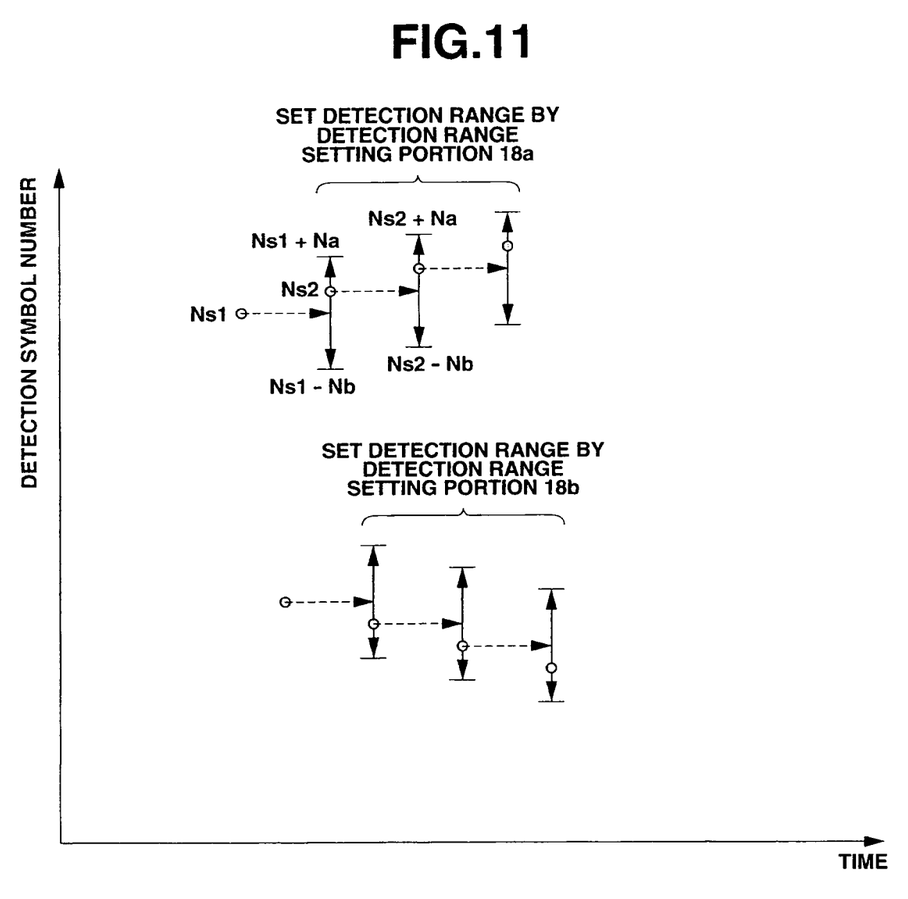
FIG. 11 is an explanatory diagram for explaining a detection range of timing detection having time on a lateral axis and a detection symbol number on a vertical axis.

Subsequently, the operation of this embodiment configured as above will be described by referring to FIGS. 10 and 11. FIG. 10 is a graph illustrating a correlation result of pattern matching in a predetermined one-frame period by having a symbol number on the lateral axis and the correlation value on the vertical axis. FIG. 11 is an explanatory diagram for explaining the detection range of the timing detection by having time on the lateral axis and the detection symbol number on the vertical axis.

The received signal is given to the pattern matching portion 11, and the received signal and the sequence A are sequentially compared for pattern and the correlation is acquired. Here, it is assumed that the correlation result illustrated in FIG. 10 is obtained in a predetermined frame. FIG. 10 illustrates that the correlation peak by the desired wave and the correlation peak by the multipath interference wave are obtained in the predetermined one-frame period by the pattern matching portion 11. The timing detection portion 30 outputs the synchronization detection symbol number corresponding to the correlation peak position of either one of the correlation peak by the desired wave and the correlation peak by the multipath interference wave.

The synchronization detection symbol number from the timing detection portion 30 is supplied to the detection range setting portions 18a and 18b. In the even-number frame, the synchronization detection symbol number from the timing detection portion 30 is given to the detection range setting portion 18a, while in the odd-number frame, the synchronization detection symbol number from the timing detection portion 30 is given to the detection range setting portion 18b.

The detection range setting portion 18a determines the range to perform the timing detection in the even-number frame two frames after the frame where the timing detection was performed for detecting the inputted synchronization detection symbol number. The detection range setting portion 18b determines the range to perform the timing detection in the odd-number frame two frames after the frame where the timing detection was performed for detecting the inputted synchronization detection symbol number.

It is assumed that the position of a symbol number Ns1, which is the correlation peak position by the desired wave in FIG. 10, is detected by the timing detection portion 30 in the predetermined even-number frame as a synchronization detection symbol number. If the synchronization detection symbol number is inputted, the detection range setting portion 18a sets the range of the symbol numbers Ns1−Nb to Ns1+Na, which is a predetermined period before and after the symbol number Ns1 in the even-number frame after two frames, as the detection range. The values of Nb and Na may be the same and the values are set larger than the value combining one symbol, which is a PN sequence fluctuation portion of the frame header in the two frames, and the fluctuation portion by the predetermined clock frequency error.

In the subsequent odd-number frame, the synchronization detection symbol number detected by the timing detection portion 30 is given to the detection range setting portion 18b. If the synchronization detection symbol number is inputted, the detection range setting portion 18b sets the range in the predetermined period before and after the inputted synchronization detection symbol number in the odd-number frame after two frames as the detection range. The range set by the detection range setting portion 18b may have the same period length as the range set by the detection range setting portion 18a.

The switching circuit 19 gives the output of the detection range setting portion 18a to the timing detection portion 30 in the even-number frame and gives the output of the detection range setting portion 18b to the timing detection portion 30 in the odd-number frame. As a result, the timing detection portion 30 performs the timing detection only in the detection range set by the detection range setting portion 18a in the even-number frame and performs the timing detection only in the detection range set by the detection range setting portion 18b in the odd-number frame.

As illustrated in FIG. 10, the detection range for the peak is set in the vicinity of the correlation peak position by the desired wave of the predetermined even-number frame illustrated in FIG. 10 two frames after the even-number frame illustrated in FIG. 10, and the correlation peak position by the multipath interference wave is not included in the detection range. Thus, the synchronization detection symbol number on the basis of the correlation peak position by the multipath interference wave is not detected by the timing detection portion 30.

The similar operation is repeated after that, and the detection range by the timing detection portion 30 is limited to the predetermined detection range in the vicinity of the peak detection position two frames before. Supposing that the synchronization detection symbol number two frames after the even-number frame illustrated in FIG. 10 is Ns2, for example, the detection range of the even-number frame further two frames after is set to Ns2−Nb to Ns2+Na. As a result, only the synchronization detection symbol number corresponding to the correlation peak position on the basis of the desired wave is outputted from the timing detection portion 30 all the time.

The synchronization detection symbol number corresponding to the correlation peak position by the multipath interference wave might be detected immediately after the clock frequency error detection is started. In this case, the detection range is set in the vicinity of the correlation peak position by the multipath interference wave after that, and the timing detection portion 30 outputs only the synchronization detection symbol number on the basis of the correlation peak position by the multipath interference wave after that. In this case, too, the clock frequency error can be detected stably.

In this embodiment as described above, the predetermined period before and after the synchronization detection symbol number corresponding to the correlation peak position is set as the detection range for the timing detection, the peak position can be acquired without being affected by the multipath interference, and the clock frequency error can be detected stably.

After the detection ranges are set by the detection range setting portions 18a and 18b, the pattern matching processing may be performed by the pattern matching portion 11 only for the predetermined period including this detection range. As a result, the arithmetic amount can be reduced not only in the timing detection portion 30 but also in the pattern matching portion 11.

Third Embodiment

Figure 12:
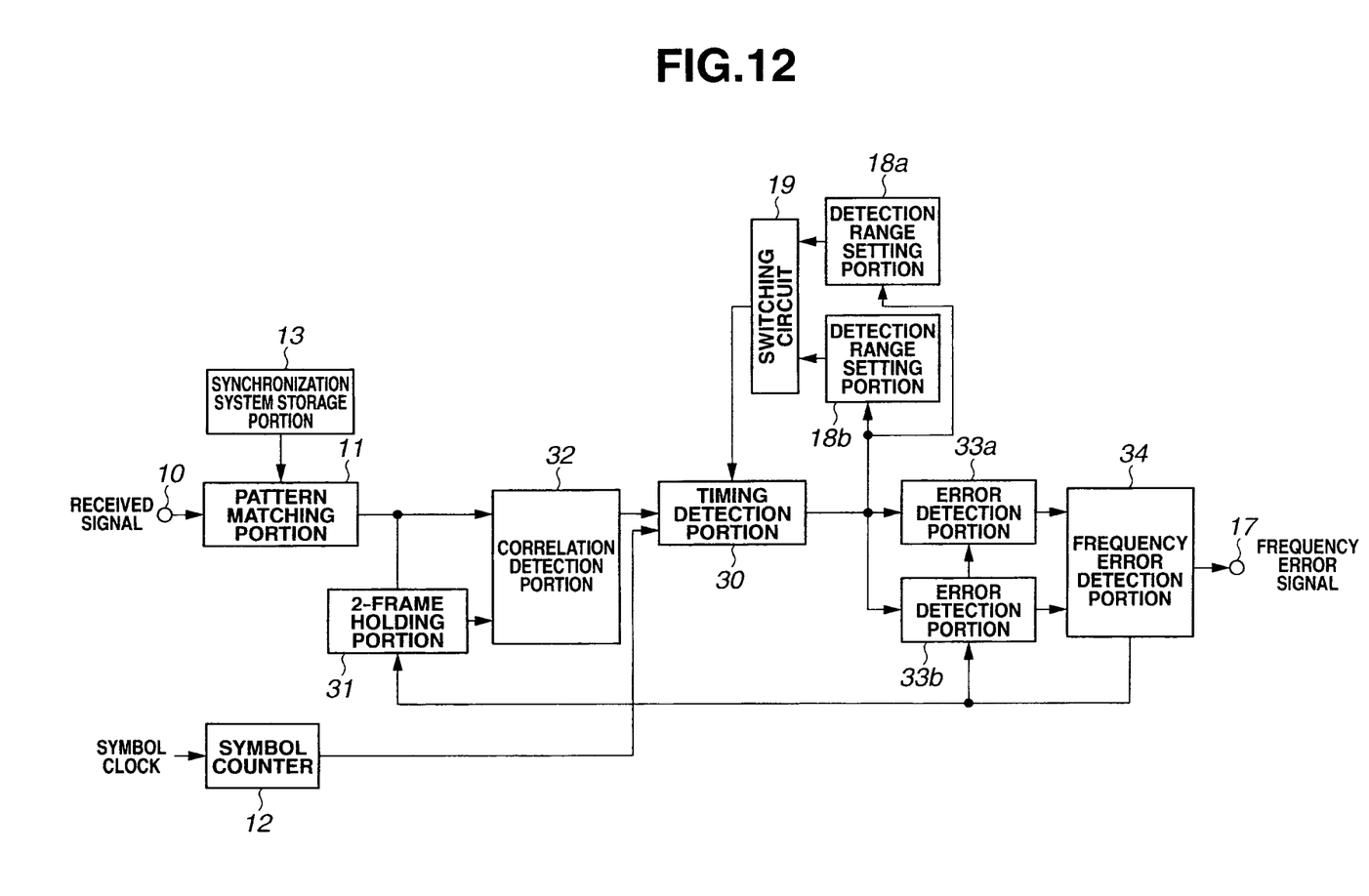
FIG. 12 is a block diagram illustrating a third embodiment of the present invention.

FIG. 12 is a block diagram illustrating a third embodiment of the present invention. In FIG. 12, the same constituent elements as those in FIG. 9 are given the same reference numerals, and the description will be omitted. This embodiment is different from the second embodiment in FIG. 9 in a point that error detection portions 33a and 33b are employed instead of the error detection portions 15a and 15b, a frequency error detection portion 34 is employed instead of the frequency error detection portion 16, and a 2-frame holding portion 31 and a correlation detection portion 32 are added.

In the second embodiment, even if the correlation peak is detected outside the detection ranges set by the detection range setting portions 18a and 18b, the timing detection not adversely affected by the multipath interference is made possible by not detecting the synchronization detection symbol number corresponding to the correlation peak position outside the detection range. However, if there are a plurality of the correlation peaks by the desired wave and the interference wave within the detection range, these correlation peaks are mixed and might be detected in the timing detection, and there is a concern that the frequency error may not be detected stably. This embodiment makes stable frequency error detection possible even in this case.

The output of the pattern matching portion 11 is supplied to the 2-frame holding portion 31 and the correlation detection portion 32. The 2-frame holding portion 31 holds the output of the pattern matching portion 11 for two frame periods and supplies the pattern matching output two frames before to the correlation detection portion 32. The correlation detection portion 32 performs a correlation calculation of the output of the pattern matching portion 11 and the output of the 2-frame holding portion 31 and supplies the correlation calculation result to the timing detection portion 30.

The 2-frame holding portion 31 may store only the pattern matching output in the detection ranges set by the detection range setting portions 18a and 18b in the outputs of the pattern matching portion 11. As a result, the correlation result having a peak at timing when the plurality of correlation peaks within the detection range match before and after the two frames is supplied to the timing detection portion 30, and detection of the correlation peak timing is made possible without being affected by the interference waves in the timing detection portion 30.

The frequency error detection portion 34 has the configuration similar to the frequency error detection portion 16 and outputs the frequency error signal on the basis of the outputs of the error detection portions 15a and 15b and also compares the detected frequency error with a predetermined threshold value. The frequency error detection portion 34 holds stored contents of the 2-frame holding portion 31 if the frequency error is not more than the predetermined threshold value and generates an update control signal for updating the stored contents of the 2-frame holding portion 31 if the frequency error exceeds the predetermined threshold value. The update control signal is supplied to the 2-frame holding portion 31 and the error detection portions 33a and 33b.

The 2-frame holding portion 31 holds the stored contents if the update control signal for holding the stored contents is inputted and takes in the output of the pattern matching portion 11 if the update control signal for update is given so as to update the stored contents. Therefore, the outputs of the pattern matching portion 11 of before and after two frames, before and after four frames, before and after six frames, . . . are inputted into the correlation detection portion 32 in accordance with the update control signals.

Moreover, the error detection portions 33a and 33b have the configurations similar to the error detection portions 15a and 15b, respectively, and the error detection portion 33a detects a change in the synchronization detection symbol number in the even-number frame, while the error detection portion 33b detects a change in the synchronization detection symbol number in the odd-number frame. If the update control signal for updating the stored contents of the 2-frame holding portion 31 is inputted, the error detection portions 33a and 33b detect changes in the synchronization detection symbol numbers for two frame periods, and if the update control signal for holding the stored contents is inputted, the error detection portions 33a and 33b enlarge the detection periods of a change in the synchronization detection symbol number by a unit of two frames.

In the embodiment configured as above, first, the output of the pattern matching portion 11 before and after two frames is inputted into the correlation detection portion 32. The correlation detection portion 32 performs a correlation calculation of the pattern matching outputs in the two frames and outputs the correlation value to the timing detection portion 30.

As a result, an output having only one peak at timing when the outputs of the pattern matching portion 11 match before and after the two frames is obtained from the correlation detection portion 32 in each frame. For example, even if the output having a plurality of correlation peaks within the detection range is outputted from the pattern matching portion 11, the correlation result having only one peak within the detection range is supplied to the timing detection portion 30.

As described above, even if an interference wave occurs either inside or outside of the detection range, the synchronization detection symbol number on the basis only of the desired wave or the synchronization detection symbol number on the basis only of the interference wave can be obtained in each frame, and the frequency error can be stably detected.

The frequency error detected by the frequency error detection portion 33 might be relatively small. In this case, the frequency error detection portion 33 outputs an update control signal to have the stored contents held by the 2-frame holding portion 31. Then, the 2-frame holding portion 31 holds the stored contents and outputs the output of the pattern matching portion 11 holding four frames, for example, to the correlation detection portion 32. In this case, the correlation detection portion 32 acquires the correlation of the outputs of the pattern matching portion 11 before and after the four frames. If the detected frequency error is small, the correlation detection portion 32 detects the correlation before and after four frames, six frames, eight frames, . . . by using the update control signal. As a result, the small frequency error that cannot be detected before and after two frames can be detected, and frequency error detection accuracy can be improved.

The error detection portions 33a and 33b change the detection period for a change in the synchronization detection symbol number by the unit of two frames on the basis of the update control signal in accordance with the correlation detection by the correlation detection portion 32. As a result, the frequency error can be detected in accordance with the correlation detection of the correlation detection portions 32.

In this embodiment as described above, the advantages similar to those in each of the above embodiments are obtained and moreover, even if the desired wave and the interference wave are mixed in the detection range, the frequency error can be detected stably. Moreover, the advantage of improvement in the frequency error detection accuracy can be also obtained.

In each of the above embodiments, the configuration in which the detection range setting portions and the error detection portions are provided in two systems for the even-number frame and the odd-number frame is illustrated, but the detection range setting portion and the error detection portion in one system may be provided so that the even-number frame and the odd-number frame are processed in a time-division manner.

The present invention is not limited to the above embodiments but is capable of various deformations within a range not departing from the gist thereof in practical stages. Moreover, the above embodiments include various stages of the invention, and various inventions can be extracted by appropriate combinations in a plurality of disclosed constituent requirements. For example, even if some constituent requirements are deleted from all the constituent requirements illustrated in the embodiments, the configuration from which the constituent requirements are deleted can be extracted as the invention if the problems described in the problems to be solved by the invention can be solved and the advantages described in the advantages of the invention can be obtained.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as world fall within the scope and spirit of the inventions.

What is claimed is:

1. A clock frequency error detecting device comprising:
    a system storage portion configured to store a synchronization system on the basis of at least one of several types of frame synchronization signals included in a received signal in which one frame is composed of a predetermined number of symbols and a frame synchronization signal in each frame includes a part obtained by shifting of a frame synchronization signal of another frame by a symbol by using a predetermined rule;
    a pattern matching portion configured to perform pattern matching between the inputted received signal and the synchronization system stored in the system storage portion;
    a symbol counter configured to count up clocks of a symbol period and to output a count value as a symbol number;
    a timing detection portion configured to detect the frame synchronization signal of each frame on the basis of a pattern matching processing result of the pattern matching portion and to output the symbol number at the detection timing; and
    a frequency error detection portion configured to detect a change of the symbol number from the timing detection portion and to detect a clock frequency error of the symbol period on the basis of a shift between the detected change and a change of the symbol number based on the predetermined rule,
    wherein the predetermined rule reverses a shift direction for each frame and increases/decreases a shift amount only by a defined amount for each frame, and
    wherein the frequency error detection portion includes:
        a first detection portion configured to detect a change in the symbol number from the timing detection portion for an even-number frame;
        a second detection portion configured to detect a change in the symbol number from the timing detection portion for an odd-number frame, and
        a third detection portion configured to detect a frequency error of a clock of the symbol period by comparing detection results of the first and second detection portions.

2. The clock frequency error detecting device according to claim 1, further comprising:
    a detection range setting portion configured to set a predetermined range on the basis of the symbol number detected by the timing detection portion to a detection range in which the timing detection portion subsequently detects the frame synchronization signal.

3. The clock frequency error detecting device according to claim 2, wherein
    the detection range setting portion sets the detection range on the basis of a shift amount of a frame synchronization signal on the basis of the predetermined rule.

4. The clock frequency error detecting device according to claim 2, wherein
    the frequency error detection portion detects the frequency error on the basis of the change in the symbol number from the timing detection portion in the even-number frame and the change in the symbol number from the timing detection portion in the odd-number frame.

5. The clock frequency error detecting device according to claim 2, wherein
    the detection range setting portion sets a first detection range on the basis of the symbol number from the timing detection portion in the even-number frame, sets a second detection range on the basis of the symbol number from the timing detection portion in the odd-number frame, sets the first detection range for the timing detection portion at time of the even-number frame and sets the second detection range for the timing detection portion at time of the odd-number frame.

6. The clock frequency error detecting device according to claim 5, wherein
    each of the first and second detection portions includes a holding portion configured to hold the symbol number from the timing detection portion, a subtractor configured to acquire a difference between an input and an output of the holding portion, and a holding circuit configured to hold the output of the subtractor; and
    the third detection portion includes an adder configured to add an output of each holding circuit of the first and second detection portions.

7. The clock frequency error detecting device according to claim 6, wherein
the detection range setting portion sets the detection range on the basis of a shift amount of a frame synchronization signal between two frames.

8. The clock frequency error detecting device according to claim 1, wherein
the frequency error detection portion detects the frequency error on the basis of the change in the symbol number from the timing detection portion in the even-number frame and the change in the symbol number from the timing detection portion in the odd-number frame.

9. The clock frequency error detecting device according to claim 2, wherein
the detection range setting portion sets the detection range on the basis of a shift amount of a frame synchronization signal on the basis of the predetermined rule.

10. A clock frequency error detecting device comprising:
a system storage portion configured to store a synchronization system on the basis of at least one of several types of frame synchronization signals included in a received signal in which one frame is composed of a predetermined number of symbols and a frame synchronization signal in each frame includes a part obtained by shifting of a frame synchronization signal of another frame by a symbol by using a predetermined rule;
a pattern matching portion configured to perform pattern matching between the inputted received signal and the synchronization system stored in the system storage portion;
a storage portion configured to store an output of the pattern matching portion;
a correlation calculation portion configured to perform a correlation calculation with the output of the pattern matching portion and an output of the system storage portion;
a symbol counter configured to count up clocks of a symbol period and to output a count value as a symbol number;
a timing detection portion configured to detect a frame synchronization signal of each frame on the basis of a correlation result of the correlation calculation portion and to output the symbol number at detection timing; and
a frequency error detection portion configured to detect a change of the symbol number from the timing detection portion and to detect a clock frequency error of the symbol period on the basis of a shift between the detected change and a change of the symbol number based on the predetermined rule,
wherein the predetermined rule reverses a shift direction for each frame and increases/decreases a shift amount only by a defined amount for each frame, and wherein the frequency error detection portion includes:
a first detection portion configured to detect a change in the symbol number from the timing detection portion for an even-number frame;
a second detection portion configured to detect a change in the symbol number from the timing detection portion for an odd-number frame, and
a third detection portion configured to detect a frequency error of a clock of the symbol period by comparing detection results of the first and second detection portions.

11. The clock frequency error detecting device according to claim 10, further comprising:
a detection range setting portion configured to set a predetermined range on the basis of the symbol number detected by the timing detection portion to a detection range in which the timing detection portion subsequently detects the frame synchronization signal.

12. The clock frequency error detecting device according to claim 11, wherein
the detection range setting portion sets the detection range on the basis of a shift amount of a frame synchronization signal on the basis of the predetermined rule.

13. The clock frequency error detecting device according to claim 11, wherein
the detection range setting portion sets a first detection range on the basis of the symbol number from the timing detection portion in the even-number frame, sets a second detection range on the basis of the symbol number from the timing detection portion in the odd-number frame, sets the first detection range for the timing detection portion at time of the even-number frame and sets the second detection range for the timing detection portion at time of the odd-number frame.

14. The clock frequency error detecting device according to claim 11, wherein
the pattern matching portion and the timing detection portion perform pattern matching or timing detection only in the detection range set by the detection range setting portion.

15. The clock frequency error detecting device according to claim 10, wherein
the frequency error detection portion detects the frequency error on the basis of the change in the symbol number from the timing detection portion in the even-number frame and the change in the symbol number from the timing detection portion in the odd-number frame.

16. The clock frequency error detecting device according to claim 11, wherein
the pattern matching portion and the timing detection portion perform pattern matching or timing detection only in the detection range set by the detection range setting portion.

* * * * *

UNITED STATES PATENT AND TRADEMARK OFFICE
CERTIFICATE OF CORRECTION

| | |
|---|---|
| PATENT NO. | : 8,948,333 B2 |
| APPLICATION NO. | : 13/419570 |
| DATED | : February 3, 2015 |
| INVENTOR(S) | : Noboru Taga et al. |

Page 1 of 1

It is certified that error appears in the above-identified patent and that said Letters Patent is hereby corrected as shown below:

On the title page, Item (73), the Assignee's name is incorrect. Item (73) should read:

-- (73) Assignee: KABUSHIKI KAISHA TOSHIBA, Tokyo (JP) --

Signed and Sealed this
Nineteenth Day of May, 2015

Michelle K. Lee
*Director of the United States Patent and Trademark Office*